(12) United States Patent
Saberan

(10) Patent No.: US 7,866,689 B2
(45) Date of Patent: Jan. 11, 2011

(54) VEHICLE SEAT FRAME STRUCTURE AND METHOD OF MANUFACTURING SAME

(75) Inventor: Mohammad Saberan, New Baltimore, MI (US)

(73) Assignee: Lear Corporation, Southfield, MI (US)

( * ) Notice: Subject to any disclaimer, the term of this patent is extended or adjusted under 35 U.S.C. 154(b) by 710 days.

(21) Appl. No.: 11/207,534

(22) Filed: Aug. 19, 2005

(65) Prior Publication Data

US 2007/0040362 A1 Feb. 22, 2007

(51) Int. Cl.
*B60R 21/16* (2006.01)
*A47C 7/02* (2006.01)
(52) U.S. Cl. ............. 280/730.2; 297/440.2; 297/452.18
(58) Field of Classification Search ............ 297/452.18, 297/440.2; 280/730.2
See application file for complete search history.

(56) References Cited

U.S. PATENT DOCUMENTS

| | | | |
|---|---|---|---|
| 1,237,956 A | 8/1917 | Pue |
| 2,647,791 A | 8/1953 | Barenyi |
| 3,446,526 A | 5/1969 | Peters |
| 3,632,157 A | 1/1972 | Lohr |
| 3,669,498 A | 6/1972 | Meyers et al. |
| 3,702,204 A | 11/1972 | Tipton et al. |
| 3,727,977 A | 4/1973 | Gmeiner |
| 3,799,577 A | 3/1974 | Colucci |
| 3,861,747 A | 1/1975 | Diamond |
| 3,896,531 A | 7/1975 | Gorman |
| 3,983,640 A | 10/1976 | Cardullo et al. |
| 4,036,527 A | 7/1977 | Faul |
| 4,124,251 A | 11/1978 | Petersen |
| 4,127,301 A | 11/1978 | Syrowik |
| 4,198,091 A | 4/1980 | Appleton |
| 4,305,616 A | 12/1981 | Martinez |
| 4,443,034 A | 4/1984 | Beggs |
| 4,479,675 A | 10/1984 | Zankl |
| 4,509,796 A | 4/1985 | Takagi |

(Continued)

FOREIGN PATENT DOCUMENTS

DE 2605952 8/1977

(Continued)

OTHER PUBLICATIONS

Office Action to DE 10 2006 039 168.3-16 dated Sep. 27, 2010.

*Primary Examiner*—Eric Culbreth
(74) *Attorney, Agent, or Firm*—MacMillan, Sobanski & Todd, LLC

(57) ABSTRACT

This invention relates to a method of manufacturing seat back frame, wherein a pair of side back frame portions are first provided. Also provided is a first upper back frame portion having an upper surface defining a first profile is provided, and a second upper back frame portion having an upper surface defining a second profile. The second profile is different from the first profile. A desired profile of a vehicle seat back frame is then determined. After the determination, one of the first and the second upper back frame portions is selected for attachment to the pair of side back frame portions corresponding to the desired vehicle seat back frame profile determined previously. The selected one of the first and the second upper back frame portions is secured to the pair of side back frame portions.

18 Claims, 5 Drawing Sheets

U.S. PATENT DOCUMENTS

| | | | |
|---|---|---|---|
| 4,524,762 A | 6/1985 | Schulman | |
| 4,526,421 A | 7/1985 | Brennan et al. | |
| 4,585,273 A | 4/1986 | Higgs et al. | |
| 4,601,517 A | 7/1986 | Heesch | |
| 4,602,817 A | 7/1986 | Raftery | |
| 4,681,367 A | 7/1987 | Timmers | |
| 4,746,168 A | 5/1988 | Bracesco | |
| 4,875,736 A | 10/1989 | Brambilla | |
| 4,881,702 A | 11/1989 | Slettebak | |
| 4,900,085 A | 2/1990 | Tobler | |
| 4,932,720 A | 6/1990 | Sherman | |
| 4,973,105 A | 11/1990 | Itou | |
| 5,007,682 A | 4/1991 | Kuwabara et al. | |
| 5,011,208 A | 4/1991 | Lewallen | |
| 5,171,054 A | 12/1992 | Wilson | |
| 5,286,084 A | 2/1994 | Bart | |
| 5,288,122 A | 2/1994 | Pilhall | |
| 5,301,914 A | 4/1994 | Yoshida et al. | |
| 5,310,154 A | 5/1994 | Ueda et al. | |
| 5,358,307 A | 10/1994 | Shafer et al. | |
| 5,366,270 A | 11/1994 | Heussner et al. | |
| 5,385,384 A | 1/1995 | Gierman et al. | |
| 5,439,271 A | 8/1995 | Ryan | |
| 5,443,239 A | 8/1995 | Laporte | |
| 5,464,273 A | 11/1995 | Makoto | |
| 5,468,050 A | 11/1995 | Hall et al. | |
| 5,472,165 A | 12/1995 | Gruber | |
| 5,485,976 A | 1/1996 | Creed et al. | |
| 5,492,361 A | 2/1996 | Kim | |
| 5,509,722 A | 4/1996 | Beroth | |
| 5,529,376 A | 6/1996 | Jovan et al. | |
| 5,547,259 A | 8/1996 | Fredrick | |
| 5,568,959 A | 10/1996 | Weber et al. | |
| 5,570,930 A | 11/1996 | LaPointe et al. | |
| 5,575,533 A | 11/1996 | Glance | |
| 5,607,204 A | 3/1997 | Gryp | |
| 5,609,395 A | 3/1997 | Burch | |
| 5,775,780 A | 7/1998 | Murphy et al. | |
| 6,217,062 B1 | 4/2001 | Breyvogel et al. | |
| 6,561,540 B1 * | 5/2003 | Hasegawa et al. | 280/730.2 |
| 6,857,698 B2 | 2/2005 | Saberan et al. | |
| 2004/0113481 A1 | 6/2004 | Saberan | |
| 2004/0227389 A1 | 11/2004 | Yoshida | |

FOREIGN PATENT DOCUMENTS

| | | | |
|---|---|---|---|
| DE | 19746234 A1 | 4/1999 | |
| DE | 102004007921 A1 | 9/2004 | |
| EP | 308374 | 3/1989 | |
| FR | 2698832 | 6/1994 | |
| GB | 2296476 A | 7/1996 | |
| GB | 2 426 925 A | 12/2006 | |
| JP | 0205238 | 12/1982 | |
| JP | 6-70827 * | 3/1994 | 297/452.18 |
| WO | 97/19727 | 6/1997 | |

* cited by examiner

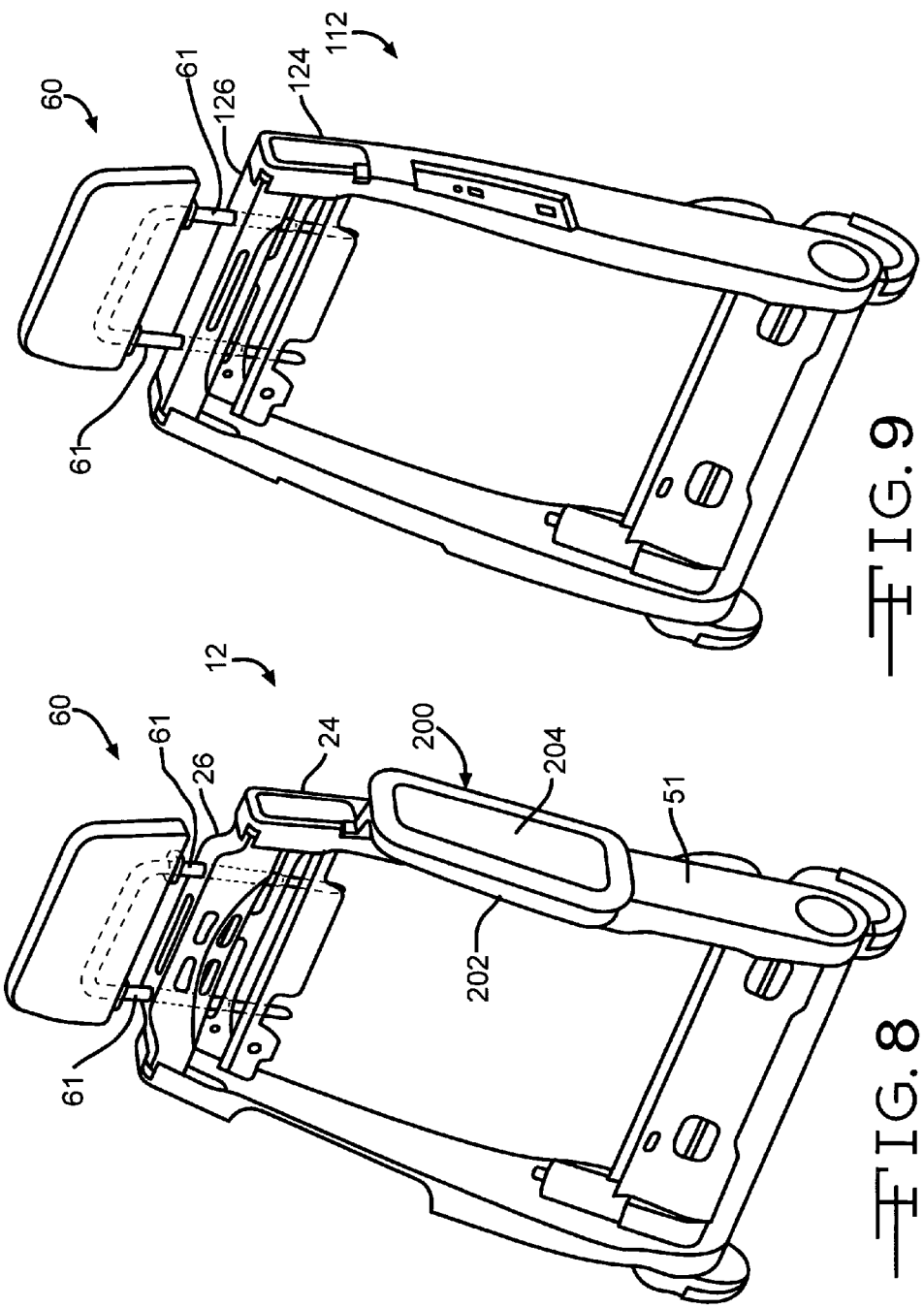

VEHICLE SEAT FRAME STRUCTURE AND METHOD OF MANUFACTURING SAME

BACKGROUND OF THE INVENTION

This invention relates in general to vehicle seat frame structures. Typically, seats for use in automotive vehicles vary in size, shape, style, and function for each particular vehicle platform. Typically, each different model of seat is manufactured with a unique frame structure provided for each vehicle platform. The size and shape of the frame structure generally conforms to the size and shape of a particular seat model to be implemented in a particular vehicle. The style and function of the frame structure is generally determined by consumer desire for appearance and utility. Since each seat model is commonly manufactured with its own unique frame structure, the seat frame structure is generally manufactured for each model specific to the size, shape, style, and function of that particular model. Portions of the seat frame structure are usually not interchangeable between different seat models, regardless of vehicle platform or original equipment manufacturer.

BRIEF SUMMARY OF THE INVENTION

This invention relates to vehicle seat frame structures, and more specifically to an improved method of manufacturing seat back frame. In a first method of manufacturing a seat back frame, a pair of side back frame portions are first provided. Also provided is a first upper back frame portion having an upper surface defining a first profile, and a second upper back frame portion having an upper surface defining a second profile. The second profile is different from the first profile. A desired profile of a vehicle seat back frame is then determined. After the determination, one of the first and the second upper back frame portions is selected for attachment to the pair of side back frame portions corresponding to the desired vehicle seat back frame profile determined previously. The selected one of the first and the second upper back frame portions is secured to the pair of side back frame portions.

In a second method of manufacturing a seat back frame, an upper back frame portion is first provided. Also provided is a side back frame portion having a side surface defining a first profile, and a second side back frame portion having a side surface defining a second profile. The first profile is different from the second profile. A desired profile of a vehicle seat back frame is then determined. After the determination, one of the first and the second side back frame portions is selected for attachment to the upper back frame portions corresponding to the desired vehicle back frame profile determined previously. The selected one of the first and the second side back frame portion is secured to the upper back frame portion.

Various objects and advantages of this invention will become apparent to those skilled in the art from the following detailed description of the preferred embodiment, when read in light of the accompanying drawings.

BRIEF DESCRIPTION OF THE SEVERAL VIEWS OF THE DRAWINGS

FIG. 8 is a perspective view of the seat back frame of seat frame of FIG. 1 shown having a high height upper frame portion, a deep pocket side back frame portion, and an air bag module installed thereon.

FIG. 9 is a perspective view of a second seat back frame shown having a low height upper frame portion, and a shallow side back frame portion.

DETAILED DESCRIPTION OF THE INVENTION

Preliminarily, it must be noted that directional labels such as upper, lower, top bottom, above, below, over, and under are used with respect to the orientation of the figure under discussion on the page, and are not intended as limitations upon the orientation of the structure of the invention's actual use.

Figure 1:
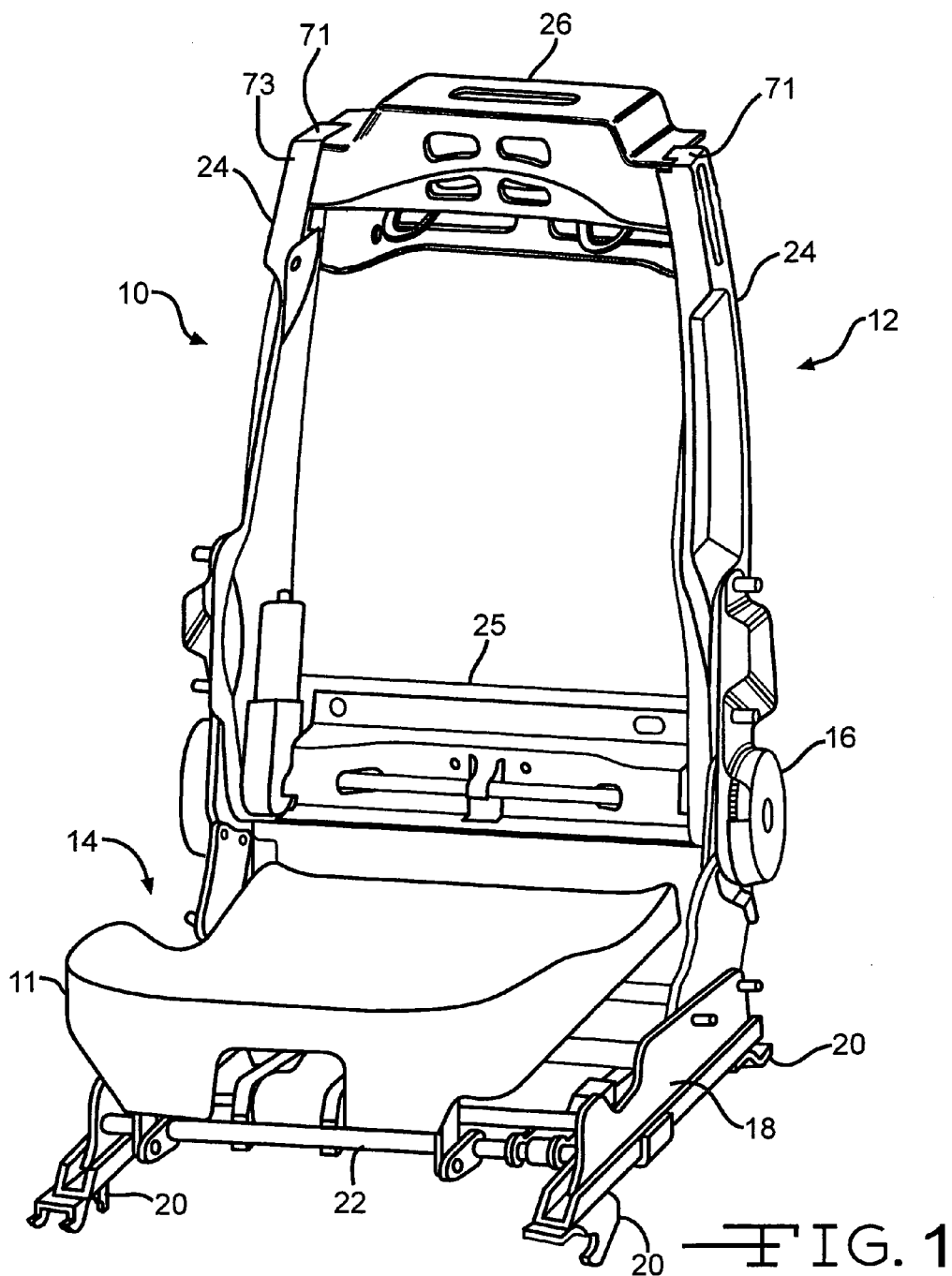
FIG. 1 is a perspective view of a seat structure having a frame manufactured in accordance with a first embodiment of the present invention.

Referring now to the drawings, there is illustrated in FIG. 1 a vehicle seat frame structure, indicated generally at 10. The seat frame structure 10 generally includes a seat back frame, indicated generally at 12, and a seat bottom frame, indicated generally at 14. The back frames 12 is suitable to support a back cushion assembly (not shown), and the bottom frame 14 is suitable to support a bottom cushion assembly 11 for supporting an occupant of the seat frame structure 10.

The back frame 12 and the bottom frame 14 are attached to one another via a recliner 16. The recliner 16 can be any conventional recliner mechanism, such as manually or electrically operated, which selectively permits the back frame 12 to pivot relative to the bottom frame 14. The seat frame structure 10 further includes a seat adjuster 18 operatively mounted to the bottom frame 14. The adjuster 18 includes mounting structures 20 for securing the adjuster 18 to a floor or frame of a vehicle. The adjuster 18 includes two pairs of upper and lower tracks slidably disposed relative to one another. The upper tracks are mounted on the bottom frame 14, and the lower tracks are mounted on the vehicle floor via the mounting structures 20. The adjuster 18 can be any suitable conventional seat adjuster mechanism for permitting the seat frame structure 10 to move in a fore and aft direction relative to the vehicle floor. The adjuster 18 can also include a conventional lift mechanism 22 for permitting the front and rear portions of the bottom frame 14 to move in generally vertical directions relative to the adjuster 18 and/or floor of the vehicle. Alternatively, the seat back frame 12 could be pivotally connected to the recliner 16 instead of the bottom frame 14 to permit the lift mechanism 22 to move the bottom frame 14 independent of the back frame 12.

The seat back frame 12 has a generally rectangular shape including a pair of generally vertical side back frame portions 24. The side back frame portions 24 are on opposed sides of the seat back frame 12 and may have a mirror image shape relative to one another. The lower sections of the side back frame portions 24 are attached together by a generally horizontally extending lower back frame portion 25. The upper sections of the side back frame portions are attached together by an upper back frame portion 26. As will be discussed below, separate and distinct seat back frames can be manufactured by replacing the upper back frame portion 26 with a differently shaped upper back frame portion. Similarly, a separate and distinct seat back frame can be manufactured by replacing one or both of the side back frame portions 24 with differently shaped side back frame portions. The upper back frame portion 26 is suitable for attaching a headrest frame, as will be further discussed below with respect to FIGS. 8 and 9.

Figure 2:
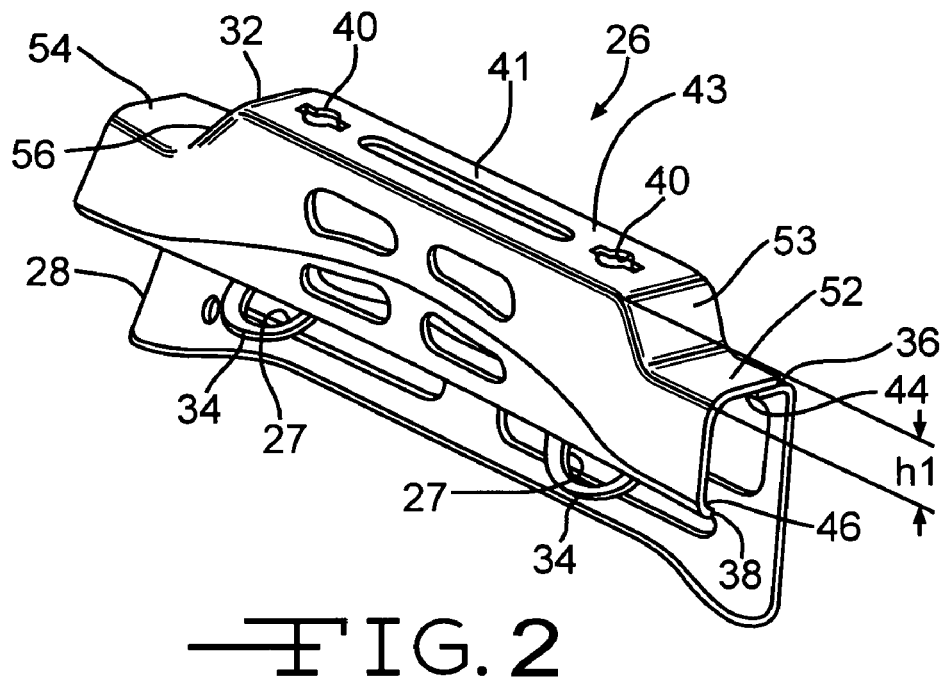
FIG. 2 is a perspective view of an upper portion of the frame of the seat frame structure of FIG. 1.

As best shown in FIG. 2, the upper back frame portion 26 is generally a two piece frame portion including a rear or first upper back frame member 28 and a front or second upper back frame member 32. Preferably, the first upper back frame member 28 and the second upper back frame member 32 are formed from a stamped sheet of metal. However, it must be understood that the first upper back frame member 28 and the second upper back frame member 32 may be formed from any suitable material in any suitable manner. It should also be understood that the upper back frame portion 26 may be formed from a single piece or any multiple number of pieces.

The first upper back frame member 28 may be attached to the second upper back frame member 32 by any suitable manner. The first and second upper back frame portions 28 and 32 preferably include overlapping mating surfaces or structures 36 and 44 respectively. The upper and lower mating surfaces 36 and 44 may simply be flat overlapping planar surfaces, or alternatively, fastening type structures. It must be understood that the mating surfaces may be any suitable structure for locating and/or securing the first upper back frame member 28 and the second upper back frame member 32 relative to one another. Preferably, the first upper back frame member 28 and the second upper back frame member 32 are secured to one another by welding portions of the upper and lower mating surfaces 36 and 44 together by spot welding. The first and second upper back frame members 28 and 32 can have any number of mating surfaces.

The upper back frame portion 26 is operable to support a head restraint system 60, as shown in FIG. 8. The second upper back frame member 32 includes two upper guide holes 40 formed in an upper surface 41 thereof. The guide holes 40 receive a pair of support posts 61 of the head restraint system 60. Generally, the guide holes 40 provide lateral or horizontal support for the head restraint system 60. The first upper back frame member 28 may include a pair of optional support members or tabs 34. The tabs 34 may include slots, recesses, or apertures 27 formed therein, for receiving the posts 61.

Although the upper back frame portion 26 is shown and described as being suitable for supporting a non-dynamic head restraint, such as the head restraint system 60 illustrated in FIG. 8, the upper back frame portion 26 could be configured to support a dynamic head restraint system. The term non-dynamic headrest refers to a headrest which may or may not be adjustable in the vertical direction or slightly tiltable, but does not move in a generally horizontal direction. Contrary, dynamic head restraint systems include headrests which are generally moveable in a horizontal direction, and sometimes also in a vertical direction, towards the head of a seat occupant. The headrest is moveably mounted on a head restraint mechanism which upon actuation, such as upon detection of a rearward impact or due to physical movement of the occupant against the seat back, to position the headrest closer to the head of the occupant to help reduce injury, such as whiplash. An example of a dynamic head restraint system for use with the present invention is disclosed in U.S. Pat. No. 6,789,845 which is hereby incorporated by reference.

As shown in FIGS. 2 and 8, the upper back frame portion 26 includes the upper surface 41 having a generally horizontal central raised surface 43 and a pair of generally horizontal side upper surfaces 52 and 54 disposed on either side of the raised surface 43. The surfaces 43 and 52, 54 are connected by sloping surfaces 53 and 56. The raised surface 43 is spaced above the side surfaces 52 and 54 by a height generally indicated by $h_1$. It is noted that the side surfaces 52 and 54 are on the opposite side of the mating surfaces 44. The side upper surfaces 52 and 54 also provide mating surfaces for connection to the vertical side back frame portions 24. As shown in FIG. 1, the vertical side back frame portions 24 include inwardly extending tabs 71 formed at upper ends 73 of the side back frame portions 24. The upper surface 41 is spaced above the upper ends 73 by approximately the height $h_1$.

Figure 3:
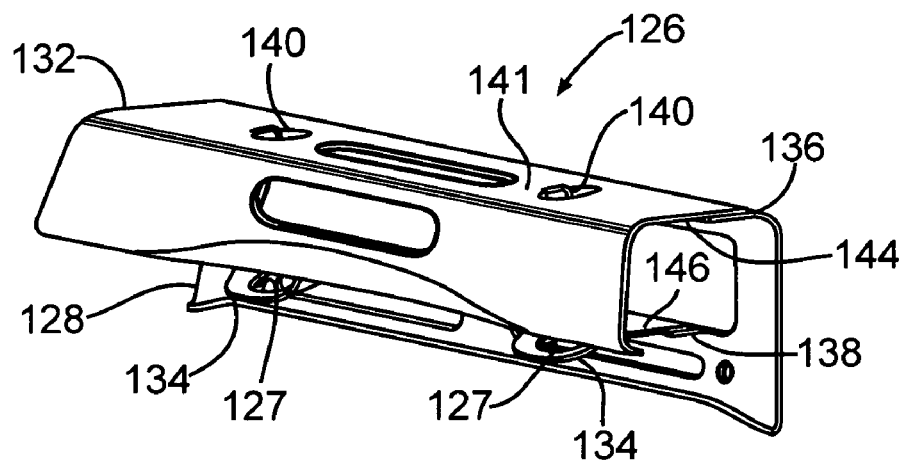
FIG. 3 is a perspective view of a second upper portion suitable for use as the upper portion of the seat frame of FIG. 1.

Now referring to FIG. 3, the present invention also contemplates the use of a second upper back frame portion 126. The second upper back frame portion 126 can be used in place of the upper back frame portion 26 to provide a seat back frame 112, as shown in FIG. 9, having a different upper profile. The upper profile of the upper back frame portion 126 is generally defined by the upper surface 141 in lieu of the raised surface 43, the side upper surfaces 52 and 54, and the sloping surfaces 53 and 56 shown in FIG. 2. The second upper back frame portion 126 is similar in function and structure as the upper back frame portion 26, with one of the exceptions being the different upper profile defined by the upper back frame portion 126, as will be explained below. Similar to the upper back frame portion 26, the second upper back frame portion 126 is suitable for receiving the head restraint system 60, or alternatively, a dynamic head restraint system (not shown).

The second upper back frame portion 126 is generally a two piece frame portion including a rear or first upper back frame member 128 and a front or second upper back frame member 132. Preferably the first upper back frame member 128 and the second upper back frame member 132 are formed from stamped sheets of metal. However, it must be understood that the first upper back frame member 128 and the second upper back frame member 132 may be formed from any suitable material and by any suitable manner. It should also be understood that the upper back frame portion 126 may be formed from a single piece or any multiple number of pieces.

The first upper back frame member 128 may be attached to the second upper back frame member 132 by any suitable manner. The first and second upper back frame portions 128 and 132 preferably include overlapping mating structures or surfaces 136 and 144 respectively. The upper and lower mating surfaces 136 and 144 may simply be flat overlapping planar surfaces, or alternatively, fastening type structures. It must be understood that the mating surfaces may be any suitable structure for locating and/or securing the first upper back frame member 128 and the second upper back frame member 132 relative to one another. Preferably, the first upper back frame member 128 and the second upper back frame member 132 are secured to one another by welding portions of the upper and lower mating surfaces 136 and 144 together by spot welding.

The second upper back frame portion 126 is operable to support the head restraint system 60, as shown in FIG. 9. The second upper back frame member 132 includes two upper guide holes 140 formed in an upper surface 141 thereof. The guide holes 140 receive the pair of support posts 61 of the head restraint system 60. Generally, the guide holes 140 provide lateral or horizontal support for the head restraint system 60. The first upper back frame member 128 may include a pair of optional support members or tabs 134. The tabs 134 may include slots, recesses, or apertures 127 formed therein, for receiving the posts 61.

As shown in FIGS. 3 and 9, the second upper back frame portion 126 includes the upper surface 141 which is substantially flat across the width of the second upper back frame portion 126. It does not include the sloping surfaces 53 and 56 of the first upper back frame portion 26, and therefore, has a different shape or profile along its upper surface 141. The relatively flat upper surface 141 generally defines the upper profile of the second upper back frame portion 126. As stated above, the second upper back frame portion 126 may be used in place of the first upper back frame portion 26. As shown in FIGS. 8 and 9, the first upper back frame portion 26 is used to form the seat back frame 12 of FIG. 8, and the second upper back frame portion 126 is used to form the seat back frame 112 of FIG. 9. Both seat back frames 12 and 112 could use the same common generally vertical side back frame portions 24 and lower back frame portion 25. Thus, two different seat back frames having different upper profiles can be manufactured by simply selecting one of the first and second upper back frame portions 26 and 126. Generally, the seat back frame 12 has a higher height than the seat back frame 112 due to the height $h_1$ spacing of the first upper back frame portion 26.

One of the advantages of replacing the first and second upper back frame portions 26 and 126 with one another is that different sized and profiled seat back frames 12 and 112 can be assembled together using other common frame members, such as the vertical side back frame portions 24 and lower back frame portion 25. The frames 12 and 112 may have different cushions and trim material installed thereon for creating different seats. In the past, different seats were made from entirely different side members and cross members. These seats were reengineered and designed and then had to undergo expensive safety tests to determine their strength under certain loads. Another advantage of the method of manufacturing a seat frame of the present invention is that since common and similar frame members are used, reengineering costs are reduced.

In another embodiment of the present invention, the side back frame portions 24 are replaced with different side back frame portions 124, instead of changing the upper back frame portion 26 and 126 as discussed above. As will be explained below, this replacement of the side back frame portions 24 and 124 is ideal for forming seat back frames depending on whether they include an air bag assembly attached thereto.

Figure 4:
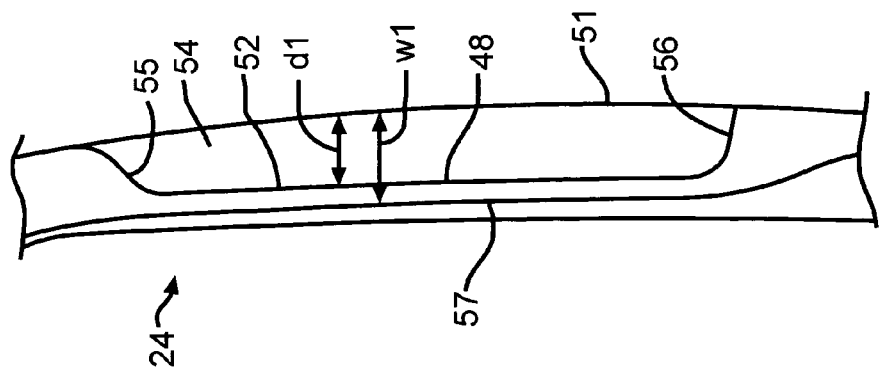
FIG. 4 is a perspective view of a side back frame portion of the seat frame structure of FIG. 1, wherein the side portion includes a deep pocket.
Figure 5:
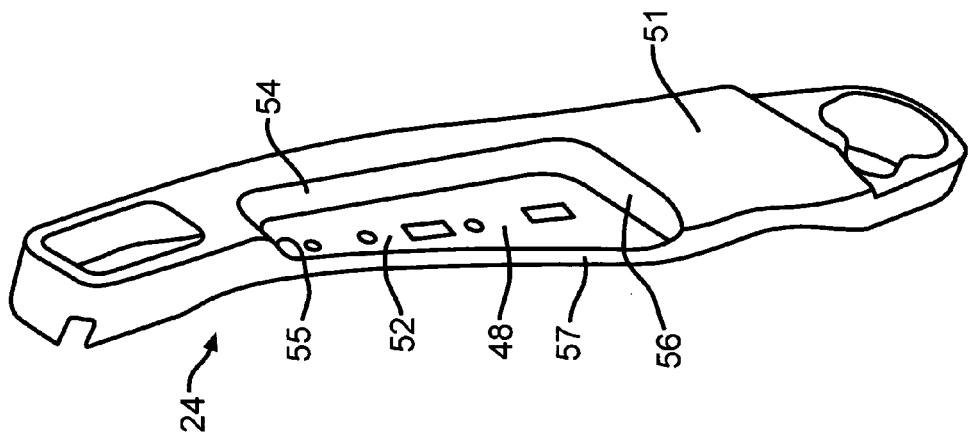
FIG. 5 is a front elevational view of a portion of the side back frame portion of the frame of FIG. 4.

There is illustrated in FIGS. 4 and 5 a first embodiment of a side back frame portion 24 for forming the seat back frame 12 of FIG. 8. The side back frame portion 24 is preferably formed from a single piece of stamped metal having a generally C-shaped cross-section. The side back frame portion 24 includes an outer side surface 51. The side surface 51 is generally the outermost inboard or outboard surface of the seat back frame 12, and thus defines the side profile of the seat back frame 12. An inwardly extending recess or pocket 48 is formed in the side surface 51. The pocket 48 defines a bottom wall 52, and a plurality of side walls 54, 55, and 56. The bottom wall 52 is spaced from the side surface 51 by a maximum depth $d_1$. The pocket 48 is relatively deep when comparing the depth $d_1$ to a width $w_1$ between the side surface 51 and an inward edge 57 of the side back frame portion 24. Preferably, the depth $d_1$ is greater than half of the width $w_1$.

This deep pocket 48 is ideally suited for housing an air bag assembly 200, as shown in FIG. 8. The air bag assembly 200 is disposed in the pocket 48. Depending on the size of the air bag assembly 200, the air bag assembly 200 may be completely disposed in the pocket 48 or extend beyond the side surface 51. Preferably, the pocket 48 is sized to house many different types and sizes of air bag assemblies, and thus the seat back frame 12, or more particularly, the side back frame portion 24 need not be replaced depending on which air bag assembly is selected to be installed. The air bag assembly 200 includes a folded air bag (not shown) disposed within a housing 202 which inflates in the event of an impact for restraining the movement of the seat passenger. The air bag assembly 200 may further include an inflator (not shown) for the storage of propellant for inflating the air bag. A hinged door 204 may be attached to the housing 202. The door 204 covers the air bag and is movable to an open or deployed position when the air bag is inflated. A bracket (not shown) may be used to attach the air bag assembly 200 to the side back frame portion 24. Different brackets may be used to accommodate different air bag assemblies.

Figure 6:
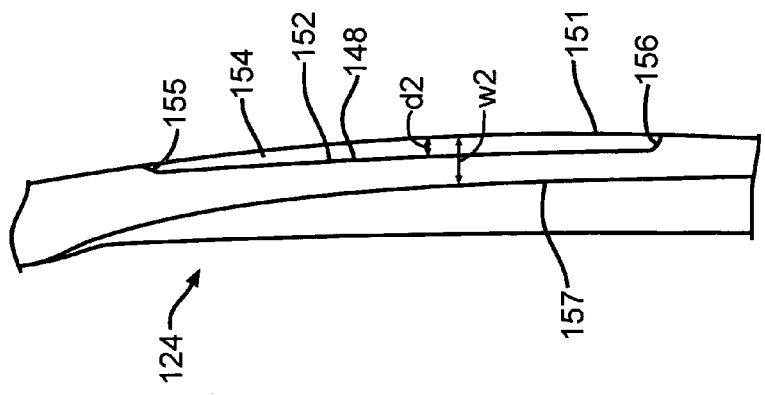
FIG. 6 is a perspective view of a second side back frame portion suitable for use as the side back frame portion of the seat frame of FIG. 1, wherein the second side back frame portion includes a shallow pocket.
Figure 7:
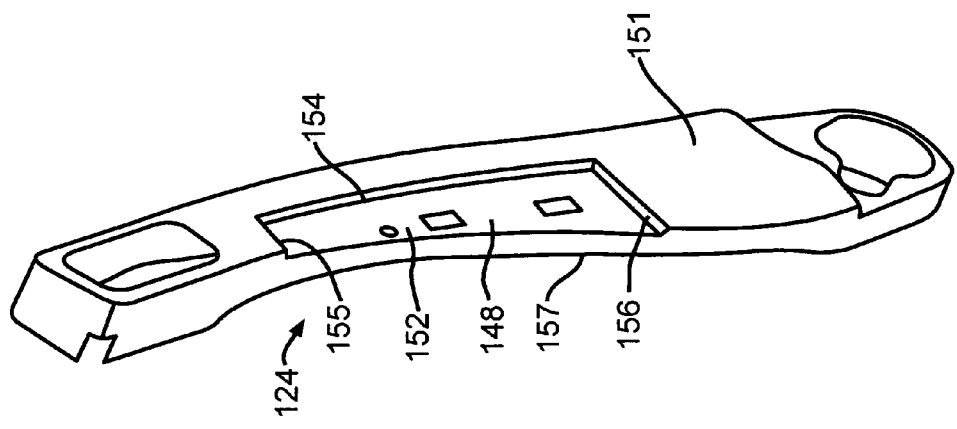
FIG. 7 is a front elevational view of a portion of the second side back frame portion of the frame of FIG. 6.

Referring now to FIGS. 6 and 7, a second side back frame portion 124 may be used in place of the first side back frame portion 24. The side back frame portion 124 is preferably formed from a single piece of stamped metal having a generally C-shaped cross section. The side back frame portion 124 includes an outer side surface 151. The side surface 151 is generally the outermost inboard or outboard surface of the seat back frame 112 of FIG. 9, and this defines the side profile of the seat back frame 112. An inwardly extending recess or pocket 148 is formed in the side surface 151. The pocket 148 defines a bottom wall 152, and a plurality of relatively small side walls 154, 155, and 156. The bottom wall 152 is spaced from the side surface 151 by a maximum depth $d_2$ relative to the width $w_2$. The pocket 148 is relatively shallow compared to the depth $d_1$ of the pocket 48. The shallow pocket 148 of the side back frame portion 124 may be used to house a relatively narrow air bag assembly (not shown), or alternatively for not receiving an air bag assembly. The side back frame portion 124 generally intrudes less into the interior of the seat back frame 112 than the side back frame portion 24 intrudes into the interior of the seat back frame 12. Thus, if the desired seat which is being manufactured does not require an air bag assembly, the side back frame portion 124 would preferably be selected to provide more room and comfort for the seat passenger.

Even if no air bag assembly is mounted within the pocket 148 of the second side back frame portion 124, the formation of the walls 152, 154, 155, and 156 of the pocket 148 provides strengthening features of the side back frame portion 124 to help prevent the side back frame portion 124 from bending or buckling during stress.

While the principle and mode of operation of this invention have been explained and illustrated with regards to particular embodiments, it must be understood, however, that this invention may be practiced otherwise than as specifically explained and illustrated without departing from its spirit or scope.

What is claimed is:

1. A method of manufacturing a vehicle seat back frame comprising the steps of:
   a. providing a pair of side back frame portions;
   b. providing a first upper back frame portion including first and second ends and having an upper surface defining an intermediate portion having a first profile that is adapted to support a head restraint system;
   c. providing a second upper back frame portion including first and second ends and having an upper surface defining an intermediate portion having a second profile that is adapted to support a head restraint system, wherein the second profile that is adapted to support a head restraint system is different from the first profile;

d. determining a desired profile of a vehicle seat back frame;

e. selecting one of the first and the second upper back frame portions for attachment to the pair of side back frame portions corresponding to the desired vehicle seat back frame profile determined in step (d); and f. securing the first and second ends of the selected one of the first and the second upper back frame portions to the pair of side back frame portions.

2. The method of claim 1, wherein step (b) is performed by providing the first upper back frame portion having a height which is greater than the height of the second upper back frame portion.

3. The method of claim 1, wherein step (b) is performed by providing the first upper back frame portion including an upper surface including a raised central portion.

4. The method of claim 3, wherein step (b) is performed by providing the upper surface of the first upper back frame portion including a generally horizontal central raised surface, a pair of generally horizontal side surfaces, and a pair of sloped surfaces disposed between ends of the raised surface and the side surfaces.

5. The method of claim 1, wherein step (c) is performed by providing the second upper back frame portion having an upper surface which is generally flat.

6. The method of claim 1, wherein the first and second side back frame portions have mirror image shapes.

7. The method of claim 6 further including the step of securing a lower back frame portion to lower sections of the side back frame portions.

8. A method of manufacturing a vehicle seat back frame comprising the steps of:

a. providing an upper back frame portion;

b. providing a first side back frame portion having a side surface defining a first profile and an outer surface having a first pocket;

c. providing a second side back frame portion having a side surface defining a second profile and an outer surface having a second pocket, wherein the first profile is different from the second profile and the first pocket on the first side back portion is deeper than the second pocket on the second side back portion;

d. determining a desired profile of a vehicle seat back frame;

e. selecting one of the first and the second side back frame portions for attachment to the upper back frame portion corresponding to the desired vehicle back frame profile determined in step (d); and f. securing the selected one of the first and the second side back frame portions to the upper back frame portion.

9. The method of claim 8, further including the step of attaching an air bag assembly to the selected one of the first and second side back frame portion.

10. The method of claim 6, further including the step of attaching an air bag assembly to the selected one of the first and second side back frame portions such that the air bag assembly is disposed in one of the first pocket and second pocket.

11. A method of manufacturing a vehicle seat back frame comprising the steps of:

a. providing first and second side back frame portions;

b. providing a first upper back frame portion having a first end portion defining a profile, a second end portion defining a profile, and an intermediate portion extending between the first and second end portions and defining a profile;

c. providing a second upper back frame portion having a first end portion defining a profile that is the same as the profile of the first end portion of the first upper back frame portion, a second end portion defining a profile that is the same as the profile of the second end portion of the first upper back frame portion, and an intermediate portion extending between the first and second end portions and defining a profile that is different from the profile of the intermediate portion of the first upper back frame portion;

d. selecting one of the first and second upper back frame portions that corresponds to a desired profile of a vehicle seat back frame; and e. securing the first and second end portions of the selected one of the first and second upper back frame portions respectively to the first and second side back frame portions to provide a vehicle seat back frame.

12. The method of claim 11, wherein step (c) is performed by providing the intermediate portion of the second upper back frame portion with a height that is greater than a height of the intermediate portion of the first upper back frame portion.

13. The method of claim 11, wherein step (c) is performed by providing the intermediate portion of the second upper back frame portion with an upper surface having a central portion that is raised relative to first and second side portions that extend respectively to the first and second end portions.

14. The method of claim 11, wherein step (c) is performed by providing the intermediate portion of the second upper back frame portion with an upper surface having a central portion that is raised relative to first and second sloped side portions that extend respectively to the first and second end portions.

15. The method of claim 11, wherein step (b) is performed by providing a first upper back frame portion that is adapted to support a head restraint system, and wherein step (c) is performed by providing a second upper back frame portion that is adapted to support a head restraint system.

16. The method of claim 11, wherein when step (e) is completed, the first and second end portions and the intermediate portion of the selected one of the first and second upper back frame portions transfer loads between the first and second side back frame portions.

17. The method of claim 11, including the further step of attaching a head restraint system to the selected one of the first and second upper back frame portions.

18. The method of claim 11, including the further step of attaching an air bag assembly to the selected one of the first and second upper back frame portions.

* * * * *